United States Patent [19]
Forster

[11] Patent Number: 4,854,739
[45] Date of Patent: Aug. 8, 1989

[54] BEARINGS FOR SLIDE SYSTEMS

[75] Inventor: Gervase L. Forster, Jordans, England

[73] Assignee: Hepco Slide Systems, Ltd., England

[21] Appl. No.: 169,502

[22] Filed: Mar. 17, 1988

[30] Foreign Application Priority Data

Mar. 20, 1987 [GB] United Kingdom ............... 8706660

[51] Int. Cl.⁴ .......................................... F16C 29/00
[52] U.S. Cl. ........................................ 384/13; 384/15
[58] Field of Search ................. 384/13, 15, 14, 53, 384/55, 58, 50; 277/DIG. 7

[56] References Cited

U.S. PATENT DOCUMENTS

| | | | |
|---|---|---|---|
| 3,515,444 | 6/1970 | Grabner | 384/15 |
| 4,376,543 | 3/1983 | Sakagami | 384/15 |
| 4,570,347 | 2/1986 | Miller | 277/DIG. 7 |

FOREIGN PATENT DOCUMENTS

| | | |
|---|---|---|
| 681412 | 10/1952 | United Kingdom . |
| 171154A | 8/1986 | United Kingdom . |
| 188683A | 10/1987 | United Kingdom . |

Primary Examiner—Lenard A. Footland
Attorney, Agent, or Firm—Arnold, White & Durkee

[57] ABSTRACT

A seal device has a generally cylindrical body forming a seating for a bearing and encloses that bearing, there being a rectangular front part which bears an orifice of shape in the embodiment of V-shape in transverse cross-section to receive a complementary edge of a member supported by the bearing so that the bearing and member can co-operate while the seal device seals the bearing against entrance of dirt, debris etc., and lubricates it as it is packed with lubricant, there being lubricant-charged felt pads in housings which wipe the member in use.

15 Claims, 2 Drawing Sheets

BEARINGS FOR SLIDE SYSTEMS

The invention relates to bearings for slide systems. Slide systems such as linearly movable machine slides where precision linear motion is to be provided for, say printing equipment or machine tools, are known. In such a system a precision ground slide having a precision V-edge is generally guided between a plurality, usually four, precision ground V-angle contact bearings, mounted for rotation on concentric or eccentric studs. The studs are mounted for rotation on a machine bed or base plate, eccentric studs being mounted opposite concentric studs to provide a simple yet effective method of adjusting any free play in the system. As the bearings bear on the V-edge of the slide, and move over it when the system is in use, there is a constant wiping action. However, the constant wiping action in use can lead to a decrease in lubrication at the bearing/slide interface, which can lead to increase in friction.

It is an object of the invention to seek to mitigate this disadvantage.

According to the invention there is provided a seal device for a bearing, comprising a body adapted to enclose the bearing in use and which has an orifice whereby a part of a bearing surface of the bearing is exposed for co-operation with a bearing surface of a member which in use is supported by the bearing.

The orifice may be complementary in external configuration to the external configuration of the respective bearing surfaces. This provides for a clear passage of the bearing member.

The orifice may be elongate and of substantially V-shape in transverse cross-section. This construction provides for accommodation of a V-section edge of an elongate member. There may be means for passing a lubricant into the body. This provides for lubrication of the bearing as desired.

The means may suitably comprise a nipple or nipples.

There may also be means for distributing lubricant over the bearing surface of the member in use. This provides a way of preventing corrosion and deterioration of the member.

The distributing means may comprise an absorbent means at or adjacent the orifice, for example two spaced pads, charged with lubricant and adapted to bear on the bearing surface of the member. This construction provides a relatively simple way of applying lubricant to the member without detrimental effect on the bearing surface of the member.

Each pad may comprise a felt pad and the body may have two seatings in which the pads are respectively housed.

The body may comprise a generally cylindrical seating for the bearing and a generally rectangular part housing the orifice.

The body may include means for securing the device to a substrate, preferably lateral wings of the body, which wings may each include an insert which holds a lower edge of the device against the substrate. This construction provides a relatively simple way of affording a positive fixing of the seal device.

The height of the insert may be slightly less than that of its respective wing so that when the seal is secured to the substrate by securing means passing through the inserts, the body is resiliently mounted on the substrate.

The body may comprise a plastic material and the inserts may also comprise a plastic material. This provides for ease of manufacture, for example by injection moulding. The body may comprise a thermoplastic elastomer polyether block amide and the insert a plastic filled with glass.

The invention extends to a slide system comprising a bearing for a slide of the system housed in a seal device as hereinbefore defined.

The seal device may include a plurality of seatings, whereby to accommodate a plurality of bearings. The bearings may be adjacent one another, in use, on one side of the slide, or on opposite sides of the slide.

There may be two seatings.

The invention also extends, it will be understood, to a slide system in which at least one bearing is received in a seating of a device as hereinbefore defined.

The slide may be a linear slide, or a curved, for example circular,slide.

A slide system and device embodying the invention are hereinafter described, by way of example, with reference to the accompanying drawings.

FIG. 5 is a perspective view, to an enlarged scale to that of FIGS. 1-4A, of a second seal device according to the invention for receiving a bearing and a slide of the system shown in FIG. 7;

FIG. 6 is a transverse sectional view of the seal device of FIG. 5, with a felt wiper pad in position; and FIG. 7 is a transverse sectional view of the slide system looking towards one bearing of the system housed in a seal device of FIGS. 5 and 6.

Figure 1:
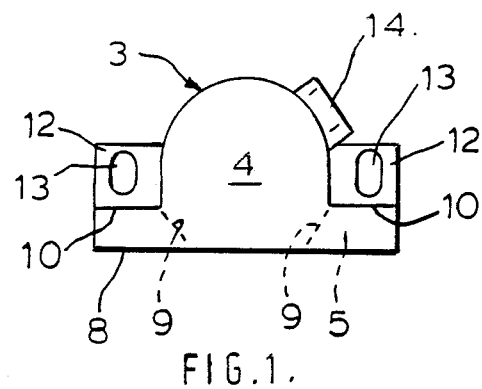
FIG. 1 is a plan view of one seal device according to the invention for receiving a bearing and a slide of the system.
Figure 3:
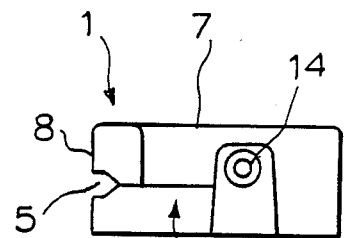
FIG. 3 is a side elevational view of the device of FIG. 2.
Figure 2:
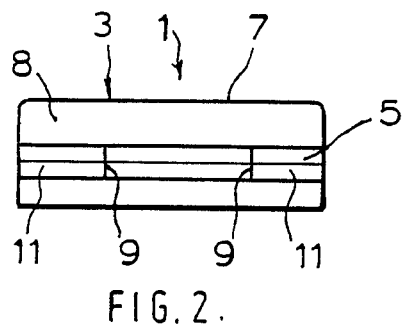
FIG. 2 is an end elevational view of the device of FIG. 1.
Figure 4:
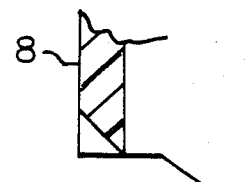
FIG. 4 is a transverse cross-sectional view of the device of FIG. 2.
Figure 4A:
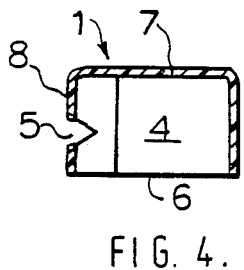
FIG. 4A is an enlarged view of part of FIG. 4.
Figure 1:
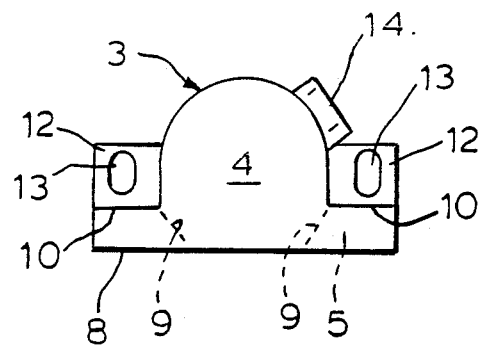
Figure 3:
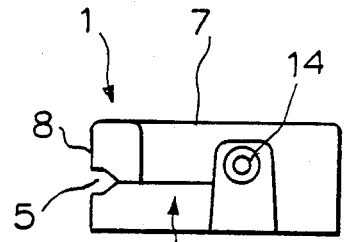
Figure 2:
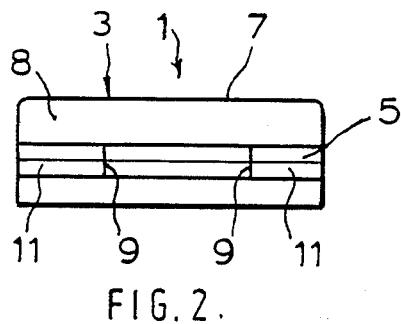
Figure 4:
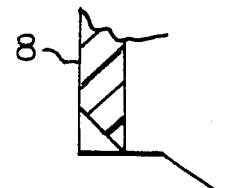
Figure 4A:
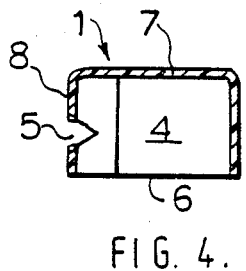

Referring to the drawings in which like parts are referred to by like reference numerals, there is shown a seal device 1,100 (FIGS. 1, 5 respectively) for housing a bearing 2 (FIG. 7), comprising a body 3 defining a seating 4 for a bearing 2 and having an orifice 5 to enable the bearing to co-operate with a bearing surface.

The body 3 is adapted to enclose the bearing 2 in use and the orifice 5 permits part of a bearing surface of the bearing to be exposed for co-operation with a bearing surface of a slide member which in use is supported by the bearing (FIG. 7).

The device 1,100 is injection moulded in one piece from plastic such as a thermoplastic polyether block amide (FIGS. 5-7) and comprises a generally curved body defining the seating 4 which is generally cylindrical to accommodate a cylindrical bearing (FIG. 7), the seating having an open bottom 6 and being closed at the top by an integral wall 7. The device 1,100 has an elongate, integral generally rectangular front 8 which defines the orifice 5 which is elongate and substantially of V-configuration in transverse section.

In both embodiments the front (in use) part of the body 3 is open to provide two inclined walls 9 of V-section connecting the front 8 of the device with rear (in use) walls 10. The walls 9 and 10 and end walls 11 of the front 8 define two end cavities 11′ in each of which a lubricant distribution agent such as an absorbent material in the form of a pad 101 of felt are received. The pads 101 are charged with oil during assembly. The rear walls 10 also are adjacent lugs or wings 12 which define holes 13 for receiving seating means such as screws, the holes 13 being elongate to provide for adjustment of the device land including integrally moulded thereon strengthening means in the form of a steel (FIG. 1-4A) or plastic reinforced with glass (FIGS. 5 and 6) insert 13', which strengthens the plastic.

In the embodiment of FIGS. 5 and 6, the insert 13' is of just less height than the wings 12 so that when the screws are inserted and tightened, the insert springs or presses down on the wings 12 to secure the lower edge of the body 3 tightly against a substrate such as a machine bed of the system. The insert has a spigot received in a socket in the wing 12 and overlies the upper (in use) surface of the wing to provide firm even pressure to provide firm mounting so that fretting or chattering of the device 1,100 in use is obviated. There is a chamfer 13" to provide for unobstructed passage of the slide.

The body 3 also has moulded thereon means whereby lubricant can be passed to the seating, the means comprising a metal nipple 14 which is integrally moulded with the device 1 and which communicates between the seating 4 and the exterior of the device 1.

The end walls 11 and pads 101 are of V-section to provide for ease of passage of the slide without interference thereof.

The seal devices 1,100 are used to protect a bearing 2 of a slide system 15 like the one shown in FIG. 7. The system comprises a precision ground linear slide 16 which has opposite precision ground V-edges 17 which are each received in V-bearings comprising in each case two wheels 18 and 19 which are mounted on a stud 20 to provide a V-configuration complementary to that of the V-edge 17. There are concentric studs and eccentric ones to enable adjustment to be made when the slide 16 is inserted to take up any slack in the system and to provide the correct pressure on the slide. The slide 16 itself may be mounted to a backing or support plate by studs, and the studs are passed through a machine bed or backing plate where they are secured by nuts, not shown, underneath the machine bed.

In use, the seal devices 1,100 are placed respectively over a bearing 2, open side down, so that the bearing 2 is closely accommodated in the body 3 and seating 4 and the base of the device rests on the machine bed 23, whereupon the devices 1,100 are secured in position by securing means such as bolts or screws which are inserted into the inserts in the holes 13 and passed through them to be screwed into tapped holes (not shown) with which they are aligned, in the machine bed 23.

The orifice 5 then faces an opposite bearing 2. When the slide 16 is inserted horizontally between the bearings, which have previously been adjusted to receive the slide, the V-edge 17 enters the V-orifice 5 for bearing engagement with the bearing 2 itself, the edges of the front face of the device defining the opening 5 itself following the contour of the V-edge. Even if they touch the flexible nature of the plastic does not hinder operation as it flexes out of the way. The slide system 15 can thus be operated in the normal way. Lubricant such as oil or grease can be pre-loaded into the seating or can be subsequently added through the nipple 14. In either case lubricant can be maintained at the bearing surfaces comprising the V-edge 17 and the V-bearing 2, so increasing life of the system. Moreover, the felt pad 101, with a V-profile usually, in each end cavity 11, is in communication with the lubricant (oil or grease) as the inner edge of the cavity 11, where each wall is cut away to form a V-shape, is directly open to the seating 4. The felt pads 101 can then absorb the lubricant and hence can apply lubricant continuously to the V-edge as it reciprocates in use of the system 1. This provides a wiping lubrication system which again enhances the life of the slide system.

Alternatively, the felt pad being charged with oil on assembly, FIGS. 5 and 6, has enough lubricant to provide lubrication and is charged by the slide 16 as it moves to and fro. In both embodiments, the seal devices 1,100 constantly apply lubricant to the location where such application is of most importance, viz., the V-groove and slide contact point.

Moreover, as the seal devices 1,100 closely follow the contour of the V-edge, and encase the bearing, they effectively keep debris out of the system and retain lubricant in the bearing.

It will be understood that each bearing 2 will usually have its own individual device, which acts as a seal or protective cap therefor. Because of the enhanced seating effect and lubrication effect, a system embodying the invention can sustain an increased load.

A system embodying a device as hereinbefore described with reference to the drawings has a greatly increased useful life, up to sixteen times that of a system which does not utilize such a device.

The seal devices 1,100 described efficiently seal, lubricate and wipe the slide profile 17, and therefore increase the load, life and linear speed of the system. This is provided for as the seal devices 1,100 enclose the individual journal bearings whilst acting as a linear seal and V-profile wiper, the seal device in both embodiments and every case being a lip seal which reduces friction to a minimum as it provides a minimum amount of seal contact with the bearing/slide system whilst giving maximum sealing, lubrication and protection against debris.

I claim:
1. A seal device for a bearing, comprising:
   (i) a body;
   (it) the body being adapted to enclose the bearing in use;
   (iii) the body defining an orifice whereby a part of a bearing surface of the bearing is exposed for cooperation with a bearing surface of a member which in use is supported by the bearing; and
   wherein the orifice is complementary is external configuration to the external configuration of the respective bearing surfaces, and wherein the orifice is elongate and of substantially V-shape in transverse cross-section.
2. A slide system comprising:
   (i) a slide;
   (it) a bearing for the slide; and
   (iii) a seal device as defined in claim 1 housing said bearing.
3. A seal device as defined in claim 1, wherein the body includes means for securing the device to a substrate.
4. A seal device as defined in claim 1, wherein the housing includes means for passing a lubricant into the body.
5. A seal device as defined in claim 4, wherein said means comprises a nipple.
6. A seal device as defined in claim 1 wherein there is means for distributing lubricant over the bearing surface of the member in use.

7. A seal device as defined in claim 1, wherein there is means for distributing lubricant over the bearing surface of the member in use, and wherein said distributing means comprises an absorbent means at the orifice.

8. A seal device as defined in claim 7, wherein the absorbent means comprises two spaced pads charged with lubricant and adapted to bear on the bearing surface of the member.

9. A seal device as defined in claim 8, wherein each said pad comprises a felt pad and wherein the body has two seatings in which said pads are respectively housed.

10. A seal device as defined in claim 1, wherein the body comprises a generally cylindrical seating for the bearing and a generally rectangular part defining said orifice.

11. A seal device as defined in claim 1, wherein the body comprises lateral wings for securing said device to a substrate.

12. A seal device as defined in claim 1, wherein the wings each include an insert which holds a lower edge of the device against the substrate.

13. A seal device as defined in claim 12, wherein the wings each include an insert which holds a lower edge of the device against the substrate, and wherein the height of said insert is slightly less than that of its respective wing whereby when the seal is secured to the substrate by securing means passing through the inserts, the body is resiliently mounted on the substrate.

14. A seal device as defined in claim 1, wherein the body and insert each comprise a plastic material.

15. A seal device as defined in claim 15, wherein the body comprises a thermoplastic elastomer polyether block amide and wherein the insert comprises a plastic filled with glass.

* * * * *